United States Patent [19]

Tashiro

[11] Patent Number: 5,755,396
[45] Date of Patent: May 26, 1998

[54] PHOTO FILM SPOOL AND MOLD SET FOR FORMING THE SAME

[75] Inventor: Akira Tashiro, Kanagawa, Japan

[73] Assignee: Fuji Photo Film Co., Ltd., Kanagawa, Japan

[21] Appl. No.: 822,346

[22] Filed: Mar. 20, 1997

[30] Foreign Application Priority Data

Mar. 22, 1996 [JP] Japan .................................. 8-066913

[51] Int. Cl.⁶ .................................................. B65H 75/28
[52] U.S. Cl. .............................. 242/584.1; 242/348.1; 242/613.1; 396/512
[58] Field of Search .......................... 242/584.1, 587.1, 242/587.2, 613, 613.1, 613.2, 613.4, 613.5, 348, 348.1, 348.2, 348.3, 348.4; 396/512, 513, 514, 515, 516

[56] References Cited

U.S. PATENT DOCUMENTS 5,555,067  9/1996  Yago et al. ........................ 242/584.1
5,564,643  10/1996  Kaya .................................. 242/348.1

*Primary Examiner*—John M. Jillions
*Attorney, Agent, or Firm*—Sughrue, Mion, Zinn, Macpeak & Seas, PLLC

[57] ABSTRACT

A spool core for winding photo film has two disk-like portions about which lateral edges of the photo film is wound. A claw support plate is disposed between the two disk-like portions, and has a substantially flat top face. Two claws are disposed to project from the top face, and retain a trailer of the photo film. Two pressing portions are disposed over the claw support plate, press the trailer against the claw support plate. First and second sector plates are disposed to project from a bottom face of the claw support plate, and have an arc-like edge. The photo film is wound to cover the arc-like edge. First and second plates are disposed between the sector plates and the disk-like portions, and project erectly from the bottom face of the claw support plate. An edge projection is disposed on an edge of the first and second plates, and satisfies a condition:

$$1.2t \leq t1 \leq 2.4t$$

where t is a thickness of the edge projection, and t1 is a thickness of the first and second plates.

7 Claims, 12 Drawing Sheets

DEFORMATION

FIG. 14B
(PRIOR ART)

PHOTO FILM SPOOL AND MOLD SET FOR FORMING THE SAME

BACKGROUND OF THE INVENTION

1. Field of the Invention

The present invention relates to a photo film spool and a mold set for forming the same. More particularly, the present invention relates to a photo film spool and a mold set for forming the same, of which molding efficiency and precision are heightened.

2. Description Related to the Prior Art

A strip of photo film is wound about a spool. The spool has a receiving slot where a trailer of the photo film is inserted and secured. The receiving slot is defined between an upper core portion and a lower core portion of the spool. A pair of retainer claws are disposed in the receiving slot to project from the lower core portion. A pair of pressing ridges are disposed in the receiving slot to project from the upper core portion. The retainer claws are engaged with a pair of retainer holes formed in the trailer of the photo film, and retain the trailer to the spool. The retainer claws are arranged in a direction parallel to a rotational axis of the spool. The pressing ridges are disposed in positions between the retainer claws, and press the trailer toward the retainer claws.

In a photo film cassette of the 135 type, the photo film prior to the photo film processing is cut away from the spool in a position outside the photo film cassette while the trailer is kept secured to the spool. The spool is not used after the photo film processing. In a photo film cassette of the IX240 type in contrast, the photo film cassette is used even after the photo film processing. This is because the photo film being developed is re-contained in the photo film cassette and returned to a user according to a system for this type. Facilitation in securing and removal of the trailer to the spool is important for the spool for the IX240 type.

U.S. Pat. No. 5,564,643 (corresponding to JP-A 6-266054) discloses the spool in which securing and removal of the trailer are facilitated without lowering retaining force of the photo film. The upper core portion of a spool core is cut at the center into the pair of resilient pressing portions. The resilient pressing portions respectively have an L-shape as viewed in horizontal section, so that ends of the resilient pressing portions are bent toward the lower core portion as ridges.

For securing and removal of the photo film with the spool, an automatic apparatus is used. The automatic apparatus includes an inserter, which is formed from flexible metal, curved in an arc-like shape and disposed in a rotatable manner. A tip of the inserter has a claw, which is engageable with a slot formed in the trailer of the photo film. The inserter is passable through a photo film passage port of the photo film cassette. With the inserter, the trailer of the photo film is inserted into the receiving slot, so that the retainer holes in the trailer are retained on the retainer claws of the spool.

In insertion of the photo film and the inserter into the receiving slot, the retainer claws and the resilient pressing portions are confronted with their advancing edge. But inserting force of the inserter shifts the resilient pressing portions upwards when the inserter contacts the resilient pressing portions. When the retainer holes formed in the trailer of the photo film come to the position of the retainer claws, the resilient pressing portions return resiliently to their initial shape, and press the photo film.

When the trailer of the photo film is retained by the retainer claws, the inserter is rotated to a standby position, and is pulled out of the photo film cassette. The retainer claws are so shaped as to hinder the photo film from moving in the direction of the pulling. The photo film remains flat even on the retainer claws. Once the retainer holes are engaged with the retainer claws, only the inserter is pulled out of the receiving slot.

To produce the spool, it is preferable to mold the spool according to injection molding in view of mass production, as the injection molding is suitable for high speed, great scale, and automation in production. In the injection molding, productivity depends upon molding cycle time, which includes mold closing time, injecting time, dwelling time, cooling time, intermediate time, and mold opening time. The spool is mounted in a cassette shell of the photo film cassette, into which the photo film is finally contained to obtain the photo film cassette as a product. The molding cycle time is determined as target time according to productivity of other parts of the photo film cassette.

Figure 14A:
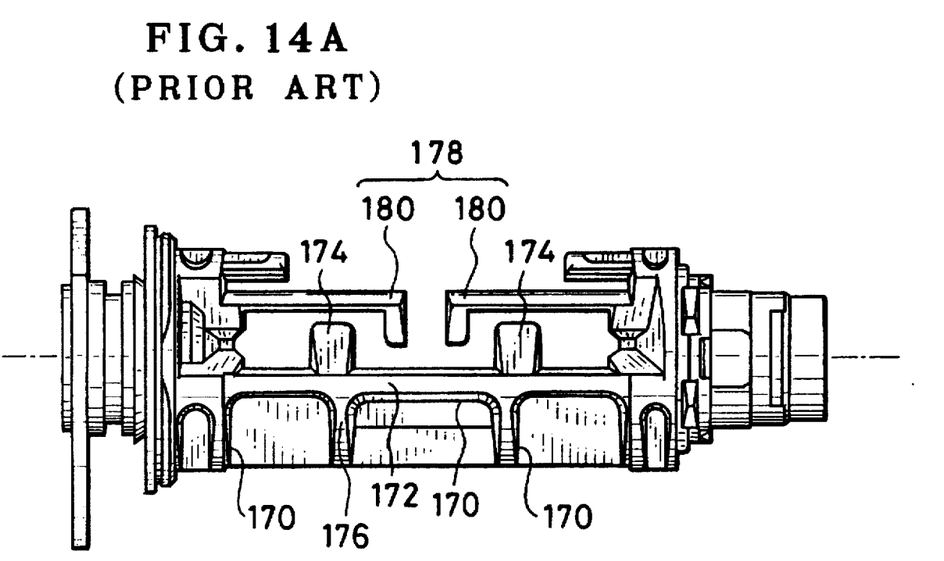
FIG. 14A is an elevation illustrating a spool core according to the prior art.

The upper core portion of the spool core is cut at the center into the resilient pressing portions. The spool core has inequality in the thickness between the lower core portion and the upper core portion having the resilient pressing portions. It is general that, if the thickness is remarkably different between parts of a single piece to be molded, molding operation is not efficient, because thickened parts are likely to receive smaller molding pressure, or because cooling is likely to be unbalanced. Such a piece has irregularity in the mold shrinkage coefficient, and is likely to have a sink mark on its surface or a hollowness within it. To overcome such difficulties, there is a technique of predetermining shapes of a number of recesses and grooves 170 formed in thickened parts 176 of the product for the purpose of equalizing or regularizing the thickness as illustrated in FIG. 14A. This technique is effective in economization of the resin material.

Figure 14B:
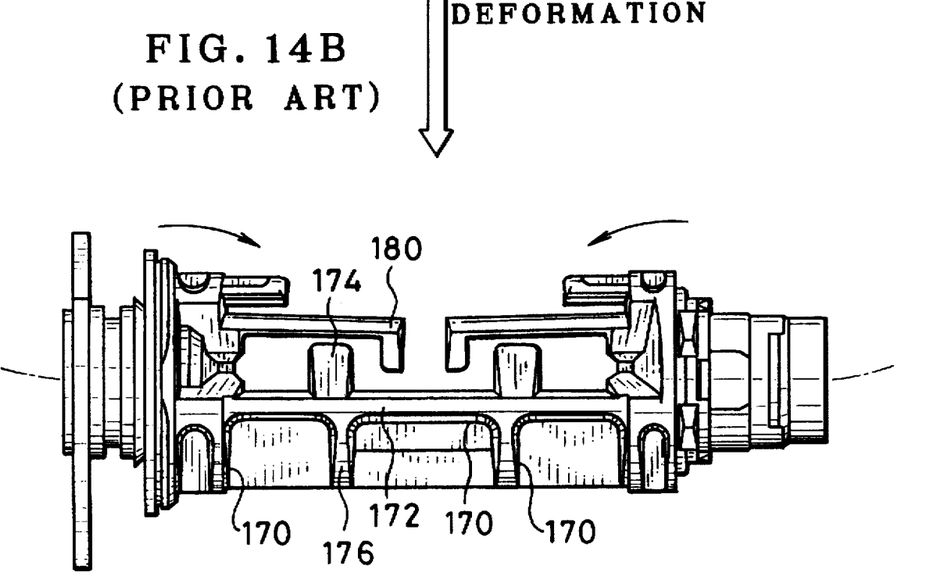
FIG. 14B is an elevation illustrating the spool core of FIG. 14A in a deformed state.

In the spool, retainer claws 174 are disposed simply on a lower core portion 172 constituting a claw support plate. If the resin economization is effected in the lower core portion 172, a structure supporting the retainer claws 174 is less rigid. If the retainer claws 174 themselves are less largely formed, the retainer claws 174 are less rigid. The insertion of the inserter is likely to deform the retainer claws 174 in an irrecoverable manner. It is impossible to effect the resin economization in association with the retainer claws 174. The cooling time in the course of the molding cycle time must be long in view of molding precision. If the cooling time is too short, axial ends of the lower core portion 172, as illustrated in FIGS. 14A and 14B, are likely to have deviation toward an upper core portion 178 having resilient pressing portions 180 as a dimensional change causing an axial shift. There is a great difference in the mold shrinkage coefficient between the thickened parts 176 near to the retainer claws 174 and positions having the resin economization because of the remarkable difference in the thickness. The cooling time, elongated for the purpose of obtaining the required precision, is a cause of long cycle time. It is impossible to reduce the cycle time of the molding to a sufficiently small target value.

SUMMARY OF THE INVENTION

In view of the foregoing problems, an object of the present invention is to provide a photo film spool and a mold set for forming the same, of which molding efficiency is heightened while keeping sufficient precision in the dimension of the spool.

In order to achieve the above and other objects and advantages of this invention, a spool core for winding photo film has first and second disk-like portions about which lateral edges of the photo film are wound. A claw support plate is disposed between the first and second disk-like portions, and having a substantially flat top face. At least one claw is disposed to project from the top face, for retaining a trailer of the photo film. At least one pressing portion is disposed over the claw support plate, for pressing the trailer toward the claw support plate. First and second sector plates are disposed to project from a bottom face of the claw support plate, and having an arc-like edge, the photo film being wound to cover the arc-like edge. First and second plates are disposed between the sector plates and the disk-like portions, to project erectly from the bottom face of the claw support plate. An edge projection is disposed on an edge of at least one of the first and second plates, the edge projection satisfying a condition:

$$1.2t \leq t1 \leq 2.4t$$

where t is a thickness of the edge projection, and t1 is a thickness of the at least one of the first and second plates.

Figure 1A:
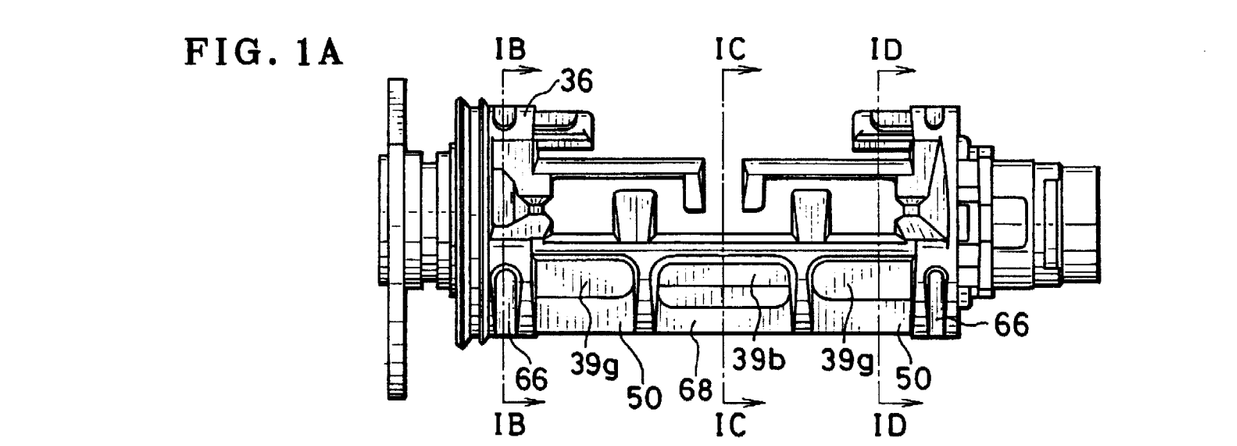
FIG. 1A is an elevation illustrating construction of a spool core according to the present invention.
Figure 1B:
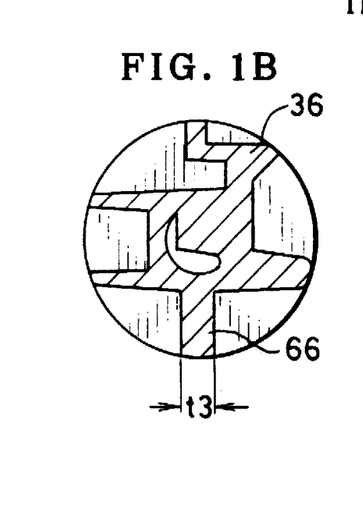
FIG. 1B is a cross section taken on line IB—IB in FIG. 1A, illustrating the spool core.
Figure 1C:
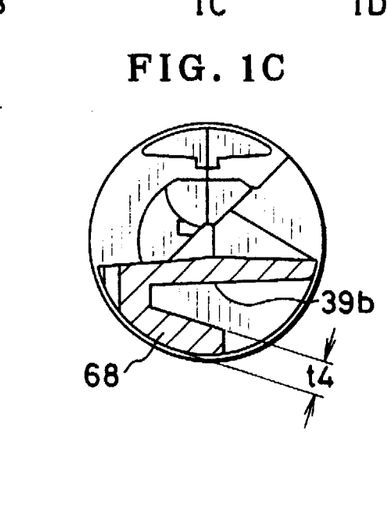
FIG. 1C is a cross section taken on line IC—IC in FIG. 1A, illustrating the spool core.
Figure 1D:
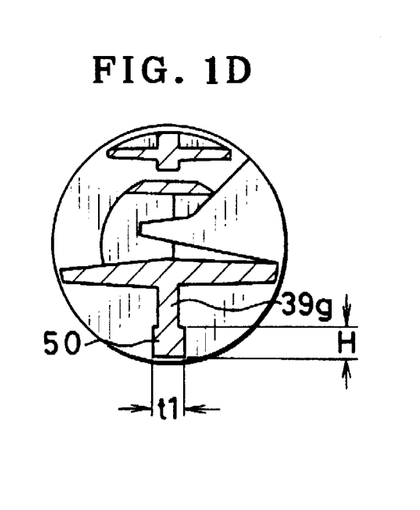
FIG. 1D is a cross section taken on line ID—ID in FIG. 1A, illustrating the spool core.

In FIGS. 1A and 1D, the at least one edge projection is designated by a reference numeral 50.

In a preferred embodiment, The edge projection has a side flush with the arc-like edge of the first and second sector plates.

The edge projection satisfies a condition:

$$1.0 \text{ mm} \leq H \leq 2.5 \text{ mm}$$

where H is a height of the edge projection.

The at least one claw comprises first and second claws, and the first and second claws are locally associated respectively with the first and second plates.

The at least one pressing portion comprises first and second pressing portions, the first and second pressing portions are disposed to project from the first and second disk-like portions in a cantilever manner.

The first and second pressing portions have respective free ends disposed between the first and second claws, and project toward the claw support plate to press the trailer.

An arc-like plate is disposed between the first and second sector plates, and projects from one side of the claw support plate, the photo film being wound to cover the arc-like plate. In FIGS. 1A and 1C, the auxiliary hole is designated by a reference numeral 39b. An arc-like plate 68 is formed by the shape of the auxiliary hole 39b.

Similarly in FIGS. 1A and 1B, an additional rigid plate 66 is formed.

To mold the spool core, a mold set includes at least first and second molds, the first and second molds having respective cavities for molding substantially halves of the first and second disk-like portions, halves of the claw support plate, halves of the at least one claw, halves of the at least one pressing portion, and halves of the first and second sector plates. An improvement of the mold set includes a first plate cavity formed in the first mold. A second plate cavity is formed in the second mold, the second plate cavity being confronted with the first plate cavity, the first and second plate cavities molding first and second plates, the first and second plates being disposed between the sector plates and the disk-like portions, to project erectly from the bottom face of the claw support plate. A first edge projection cavity is formed in the first mold. A second edge projection cavity is formed in the second mold, the second edge projection cavity being confronted with the first edge projection cavity, the first and second edge projection cavities molding at least one edge projection, the edge projection being disposed on an edge of at least one of the first and second plates. The first and second edge projection cavities satisfy a condition:

$$1.2t \leq t1 \leq 2.4t$$

where t is a sum of depths of the first and second plate cavities, and t1 is a sum of depths of the first and second edge projection cavities.

BRIEF DESCRIPTION OF THE DRAWINGS

The above objects and advantages of the present invention will become more apparent from the following detailed description when read in connection with the accompanying drawings, in which:

FIGS. 11A–11C are cross sections illustrating a set of two molds for molding the spool core;

DETAILED DESCRIPTION OF THE PREFERRED EMBODIMENT(S) OF THE PRESENT INVENTION

Figure 2:
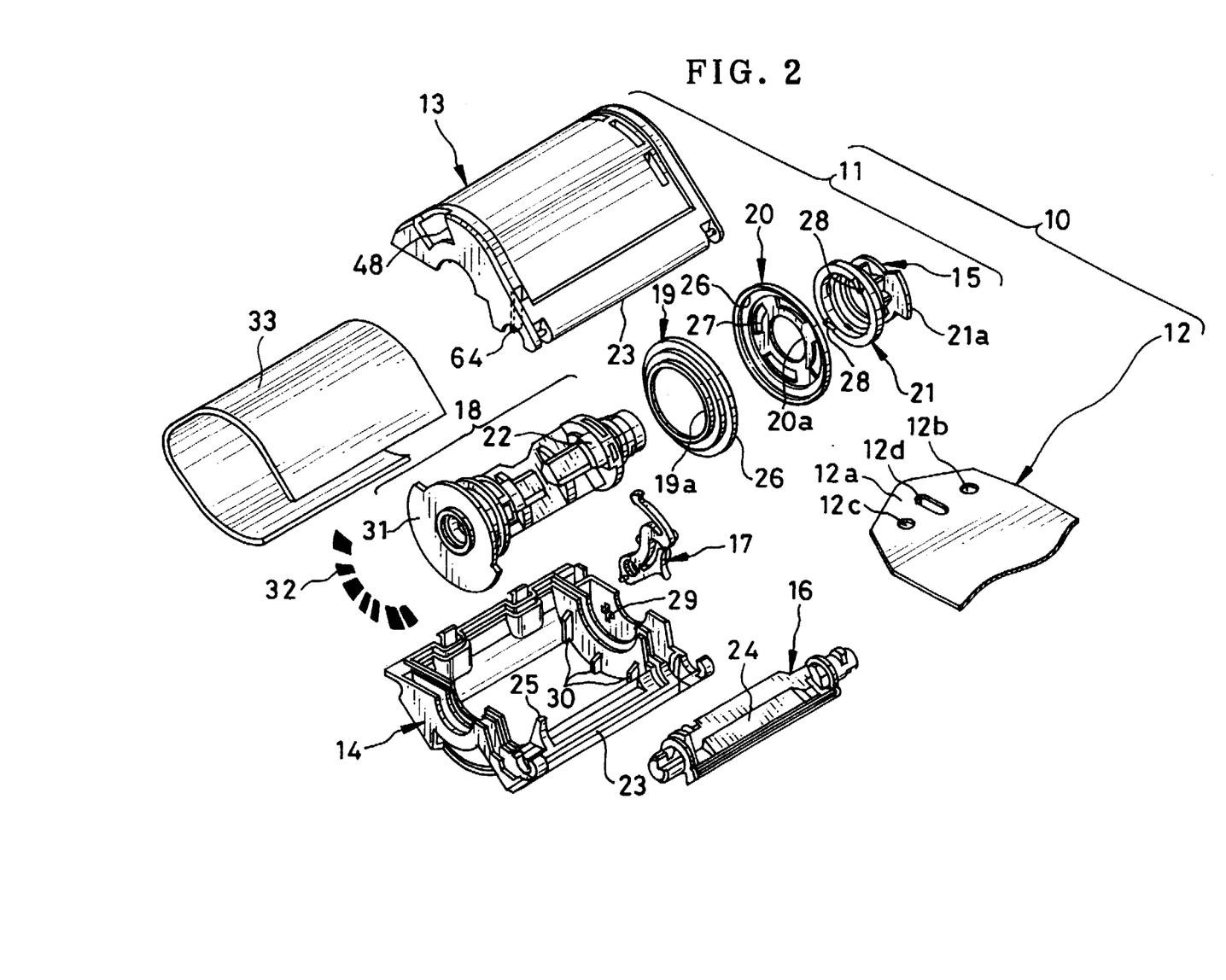
FIG. 2 is an exploded perspective illustrating a photo film cassette.

In FIG. 2, a photo film cassette 10 of the IX240 type includes a cassette shell 11 and a photo film 12 contained in the cassette shell 11. The cassette shell 11 has a pair of shell halves 13 and 14, a spool 15, a cassette shutter 16 and a spool lock 17. The shell halves 13 and 14 are respectively formed from plastic material. The spool 15 includes a spool core 18, a pair of flange disks 19 and 20, and a status indicator barrel 21. The flange disks 19 and 20 are secured to axial ends of the spool core 18. Those elements of the spool 15 are assembled together as a unit, and are contained between the shell halves 13 and 14 in a rotatable manner. The photo film 12 is wound about an arcuate surface 22 of the spool core 18 between the flange disks 19 and 20 in a roll form.

The shell halves 13 and 14 are respectively semi-cylindrical, and have port tongues 23 formed to project from a respective one of them. When the shell halves 13 and 14 are fitted together, the cassette shutter 16 is received between the port tongues 23 in a rotatable manner. A photo film passage port 24 of a flat shape is formed through the cassette shutter 16. When the cassette shutter 16 is rotated to an open position, the photo film passage port 24 communicates externally for passage of the photo film 12. When the cassette shutter 16 is rotated to a closed position, a gap between the port tongues 23 is completely closed, so that the inside of the cassette shell is shielded from ambient light.

A separator projection 25 or claw is formed with the second shell half 14 in a position inward from the port tongues 23. The separator projection 25 separates a leader of the photo film 12 from its roll about the spool core 18, and guides it toward the photo film passage port 24. Axial holes 19a and 20a are respectively formed in the flange disks 19 and 20. The spool core 18 is inserted into the axial holes 19a and 20a so that the flange disks 19 and 20 are positioned on the spool core 18 suitably in a rotational manner.

Circumferential lips 26 are formed integrally with the periphery of the flange disks 19 and 20. Between the flange disks 19 and 20, the circumferential lips 26 project toward one another, and cover lateral edges of the outermost turn of the photo film 12 in a partial manner.

Four retainer holes 27 are formed in the flange disk 20 about the axial hole 20a at a regular rotational pitch. Two clutch claws 28 are formed on the status indicator barrel 21. When the spool 15 is rotated in a direction to unwind the photo film, the clutch claws 28 become fitted in two of the retainer holes 27, to rotate the flange disk 20 forcibly. When the spool 15 is rotated in a direction to wind back the photo film, the clutch claws 28 are not fitted in any of the retainer holes 27, but render the flange disk 20 rotatable. The flange disk 19 is always rotatable with respect to the spool core 18. An indicator plate 21a of a sector shape is formed integrally with the status indicator barrel 21. A position of the indicator plate 21a is observed through an indicator window 29 formed in the cassette shell 11, and represents information of a used status of the photo film cassette 10.

Ridges 30 are formed on inside surfaces of the shell halves 13 and 14, and prevent the flange disks 19 and 20 from being spread. A sector-like data plate 31 is formed integrally with the spool core 18 in a position outside the flange disk 19. A bar code 32 is printed on the sector-like data plate 31 by use of a technique of hot-stamping. The bar code 32 is a rotary bar code arranged radially about the rotational axis of the spool core 18. When the spool 15 is rotated, the bar code 32 is detected photoelectrically in a camera through a window 48, which is formed in the first shell half 13. Type information, frame number information and the like of the photo film 12 in the cassette shell is electrically detected. A label or sticker 33 is attached to the outside of the cassette shell. The sticker 33 has printed indication including the photo film type and an identification (ID) number of the cassette.

The spool lock 17 blocks rotation of the spool 15 when the cassette shutter 16 is rotated to the closed position. The spool lock 17 is ineffective in locking the spool 15 when the cassette shutter 16 is rotated to the open position. A reference numeral 64 designates a lock pawl, which is formed integrally with the first shell half 13, for blocking rotation of the cassette shutter 16 upon rotation of the cassette shutter 16 to the closed position. The lock pawl 64 is ineffective in locking the cassette shutter 16 when the photo film cassette 10 is set in a camera or a display device, because an opener mechanism releases the cassette shutter 16 from the lock pawl 64 before it opens the cassette shutter 16.

In a trailer 12a of the photo film 12 are formed retainer holes 12b and 12c and a slot 12d. The retainer holes 12b and 12c are formed for retention of the trailer 12a to the spool core 18. The slot 12d is adapted to a claw of an inserter of an automatic apparatus used in a photo laboratory for photo film processing.

Figure 3:
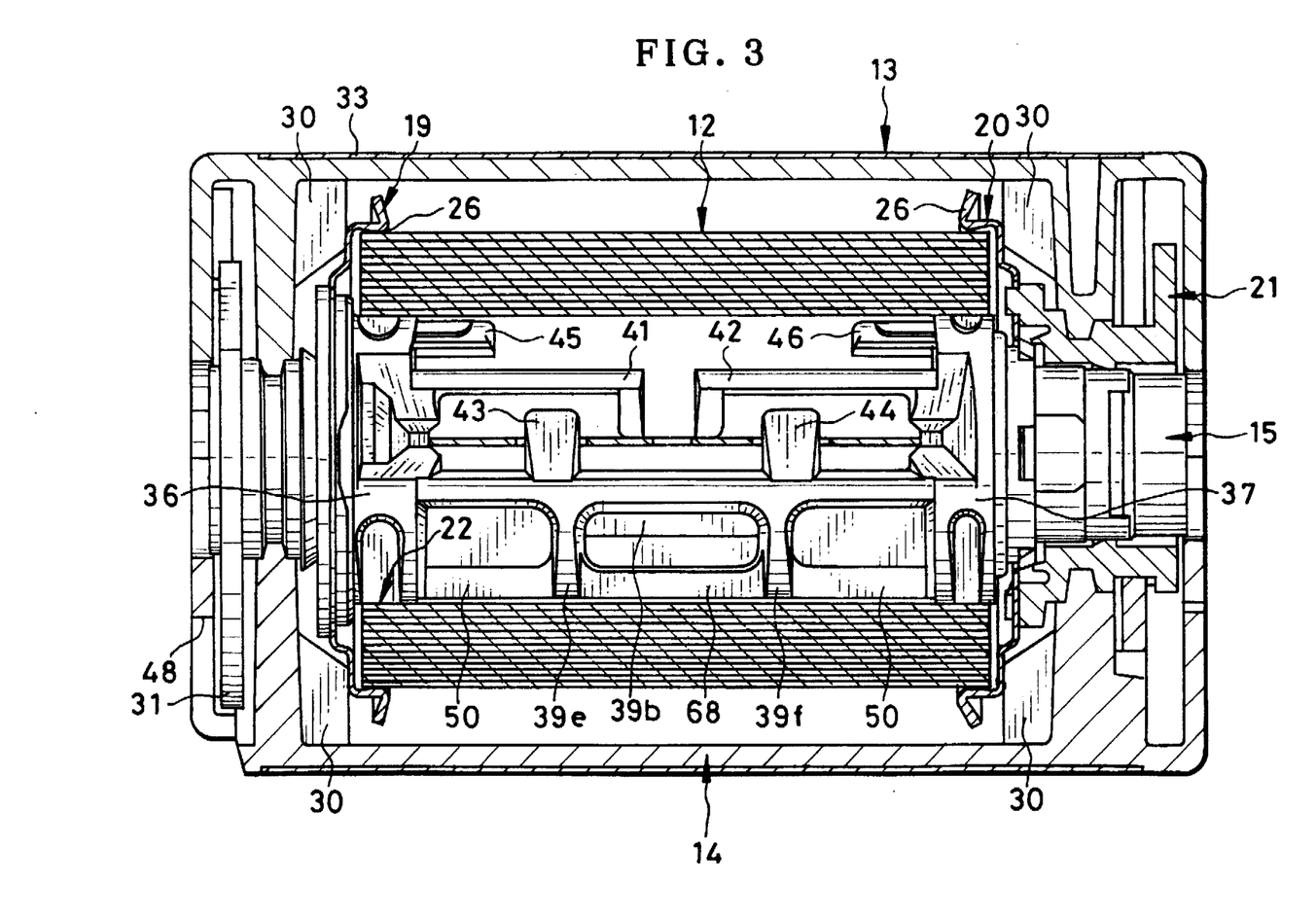
FIG. 3 is a vertical section illustrating the photo film cassette.

In FIG. 3, when the entirety of the photo film 12 is contained in the cassette shell 11, the outermost turn of the photo film 12 is partially covered by the circumferential lips 26 of the flange disks 19 and 20, and is prevented from being loosened about the spool 15. When the spool 15 is rotated in the unwinding direction with the roll of the photo film 12, the roll is rotated together with the spool 15.

Although the ridges 30 regulate the flange disks 19 and 20, confronted pairs of the ridges 30 have an increasing interval in a position inward from the spool 15 for release of the flange disks 19 and 20 from the ridges 30. When the leader of the photo film 12 is advanced through the photo film passage port 24 after separation of the leader at the separator projection 25, the flange disks 19 and 20 are spread away from one another to a small extent, so that the photo film 12 exits from the space between the circumferential lips 26 in a form curled like an arch.

When a camera is loaded with the photo film cassette 10, a mechanism of the camera releases the spool lock 17 from retention of the cassette shutter 16, before the cassette shutter 16 is rotated toward the open position. Then the spool 15 is rotated in the unwinding direction, to advance the leader of the photo film 12 to the outside of the cassette shell 11. The circumferential lips 26 about the flange disks 19 and 20 prevent the photo film 12 from loosening, so that the roll of the photo film 12 rotates together with the spool 15. The leader of the photo film 12 is separated by the separator projection 25, and directed into the photo film passage port 24.

The leader of the photo film 12 advances through the photo film passage port 24. The circumferential lips 26 are spread away from one another. The lateral edges of the photo film 12 are released from being covered in the position inward from the photo film passage port 24. The flange disk 20 is rotated in the unwinding direction by the virtue of engagement of the clutch claws 28 and the retainer holes 27. The force for advancing the photo film 12 is increased by the flange disk 20. The leader of the photo film 12 is finally exited from the cassette shell.

To wind the photo film 12 back into the cassette shell 11, the spool 15 is rotated in the winding direction reverse to the unwinding direction. As the trailer 12a of the photo film 12 is retained on the spool 15, the photo film 12 is wound back into the cassette shell 11 when the spool 15 rotates. Lateral edges of the photo film 12 spread the circumferential lips 26.

The photo film 12 is safely moved to a space between the flange disks 19 and 20, and is wound about the arcuate surface 22 of the spool 15.

Figure 4:
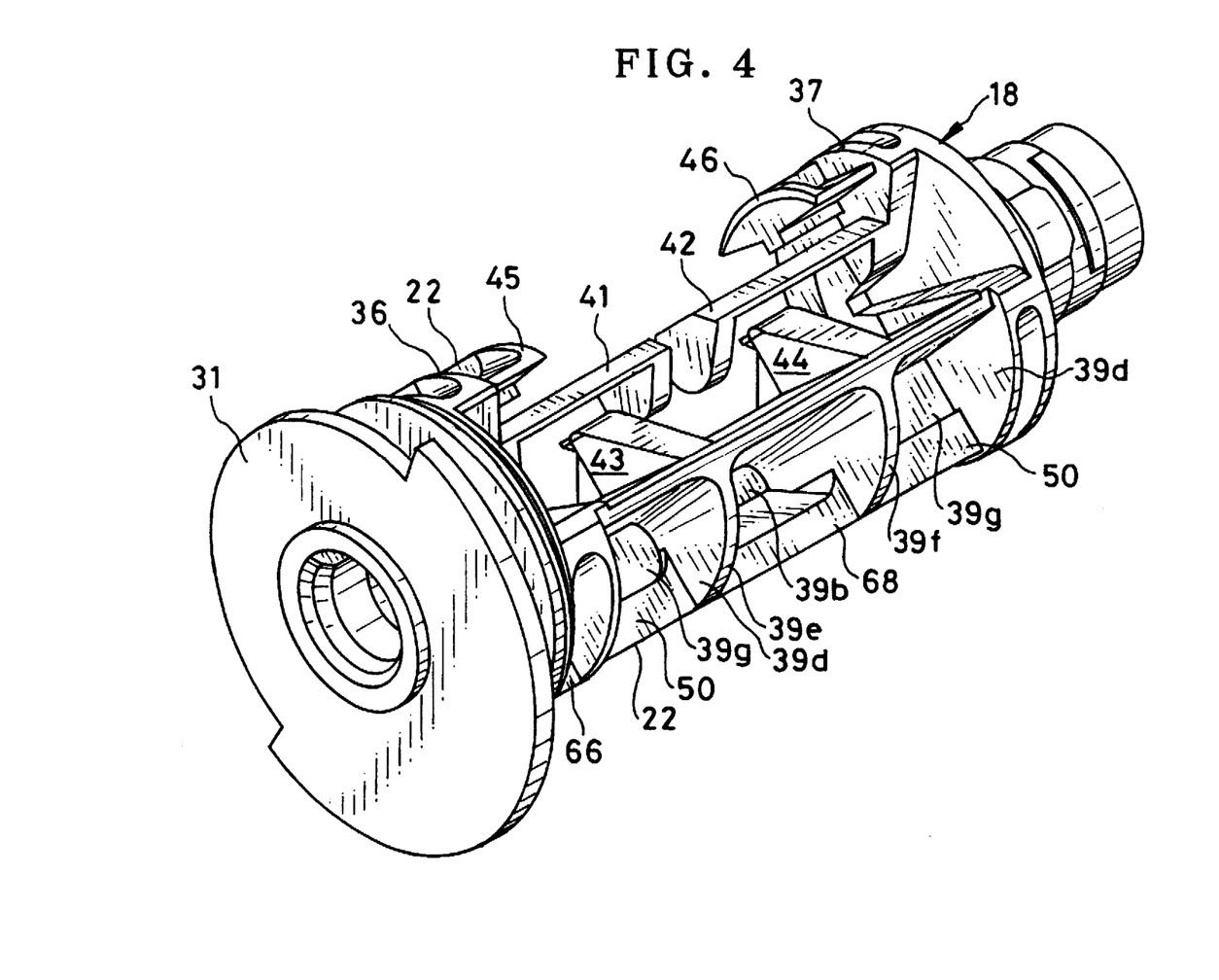
FIG. 4 is a perspective illustrating the spool core.
Figure 5:
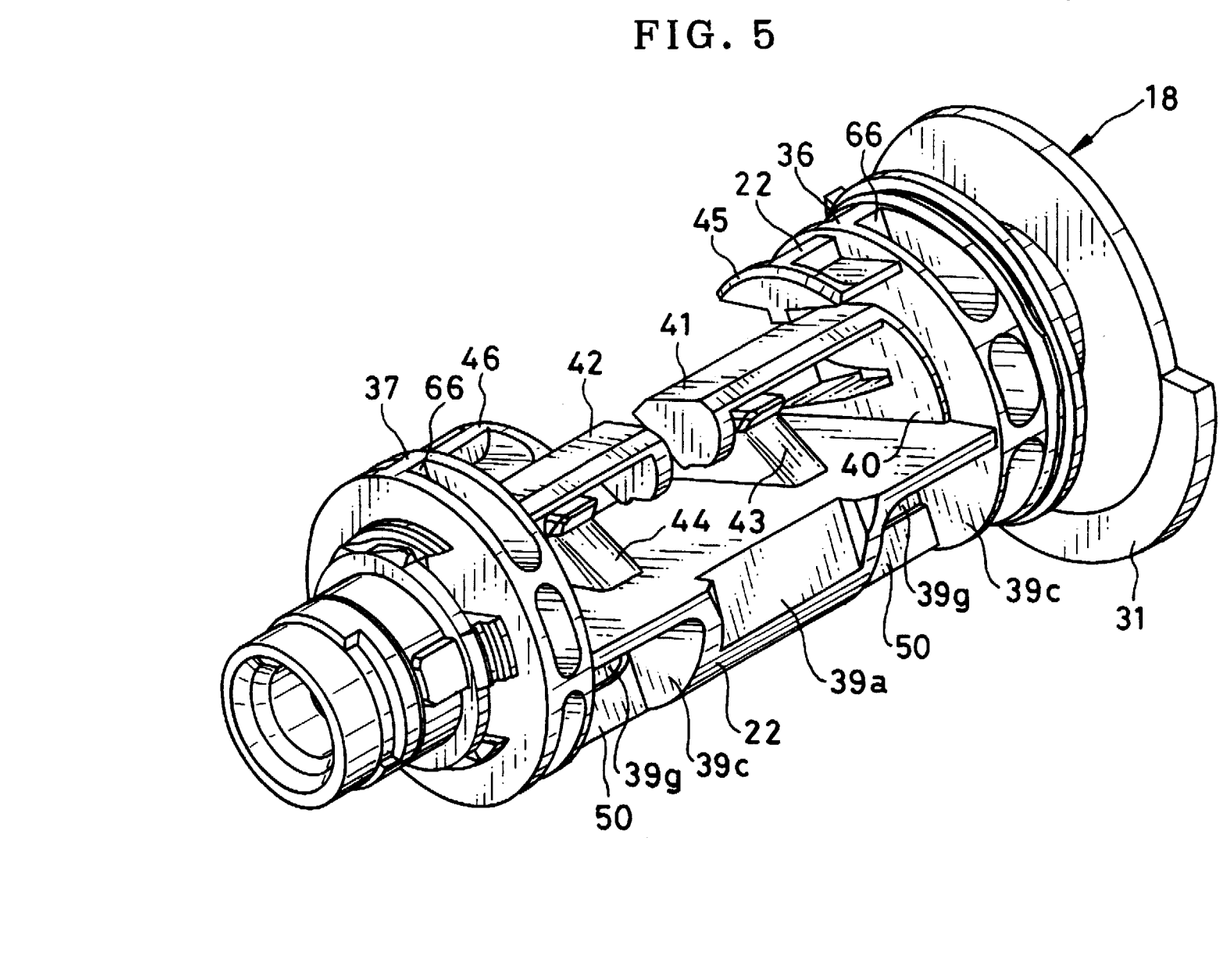
FIG. 5 is a perspective illustrating the spool core as viewed opposite to FIG. 4.

In FIGS. 4 and 5, the spool core 18 is molded according to injection molding from the flexible plastic material. A number of recesses and grooves are formed in the spool core 18 in such positions that the molds having projections for those can be suitably released, for the purposes of saving a required amount of the plastic material, and regularizing a local thickness of the spool core 18 between its various positions. Those recesses and grooves define a number of ridges or straight margins, which heighten rigidity of the arcuate surface 22, and prevent unwanted corrugation or any deformation.

Figure 6:
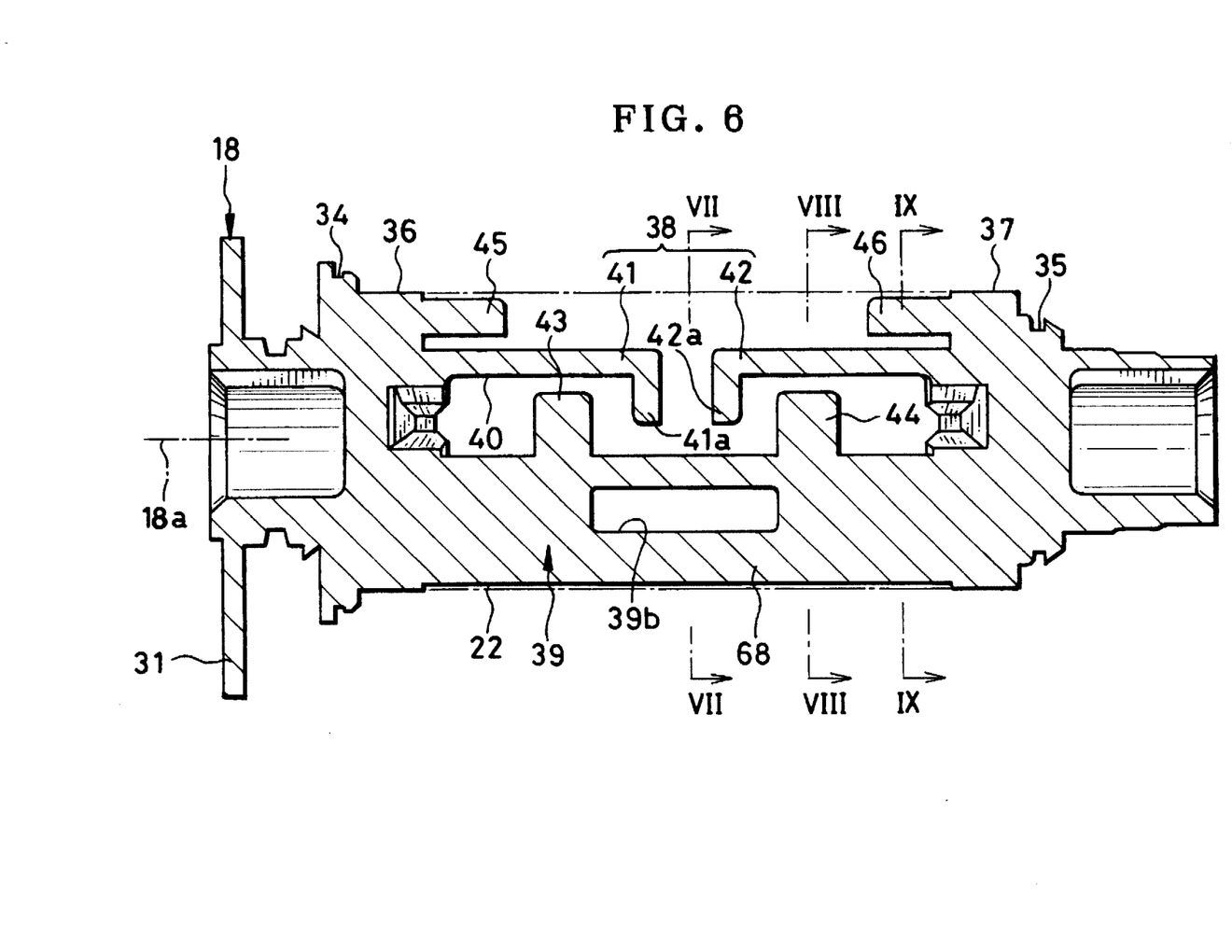
FIG. 6 is a vertical section illustrating the spool core.

In FIG. 6, there are disk receivers 34 and 35 formed in axial positions of the arcuate surface 22 for receiving the flange disks 19 and 20. Disk-like portions 36 and 37 or inner hubs are formed on the arcuate surface 22 in positions respectively inside the disk receivers 34 and 35, for contact with the lateral edges of the innermost of the turns of the photo film 12. The disk-like portions 36 and 37 have a predetermined width, and define a range of the arcuate surface 22 between them, so that the photo film 12 is wound about the arcuate surface 22. The arcuate surface 22 is constituted by a claw support plate 39 or first core portion, and a second core portion 38 into which the arcuate surface 22 is split with reference to a rotational axis 18a. A receiving slot 40 is defined between the core portions 38 and 39. The second core portion 38 is split by a central gap into a pair of resilient pressing portions 41 and 42. Distal ends of the resilient pressing portions 41 and 42 are shaped with protrusions 41a and 42a directed toward the claw support plate 39, for the purpose of pressing the photo film trailer for retention.

A pair of retainer claws 43 and 44 are formed integrally with the claw support plate 39, confronted with the resilient pressing portions 41 and 42, and arranged at an interval greater than the interval between the protrusions 41a and 42a.

A pair of support tongues 45 and 46 are formed to project respectively from the disk-like portions 36 and 37 or hubs in positions outside the resilient pressing portions 41 and 42, for the purpose of constituting part of the arcuate surface 22 without eccentric winding of the photo film 12 on the resilient pressing portions 41 and 42. As illustrated in FIG. 3, there is a narrow space between the innermost turn of the photo film 12 and such positions as the support tongues 45 and 46 and a core surface of the claw support plate 39, because only the disk-like portions 36 and 37 among positions of the arcuate surface 22 contact the photo film 12. This is for the purpose of avoiding scratching a region of the photo film 12 for effective frames defined between marginal regions along the lateral edges of the photo film 12.

Figure 7:
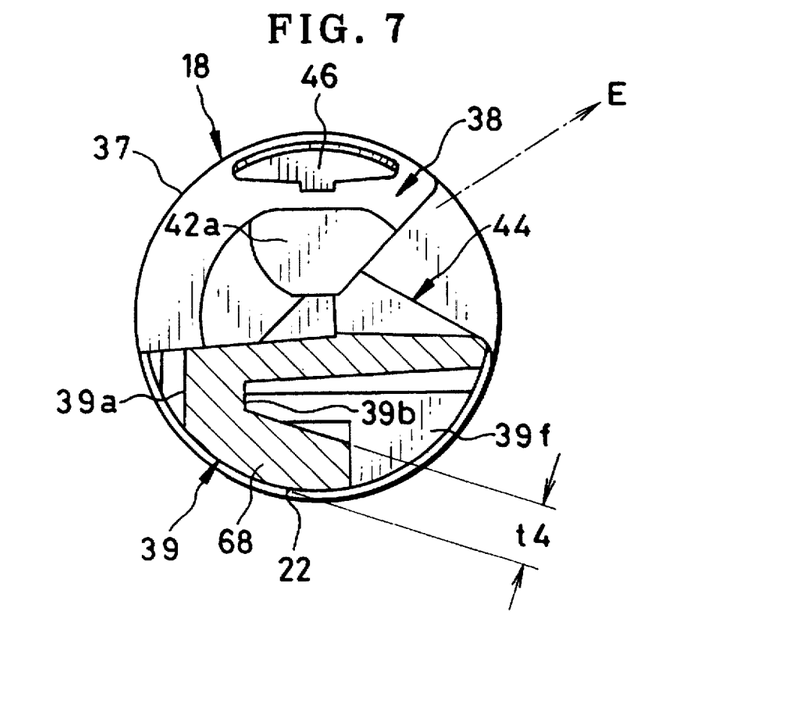
FIG. 7 is a cross section taken on line VII—VII in FIG. 6, illustrating the spool core.
Figure 8:
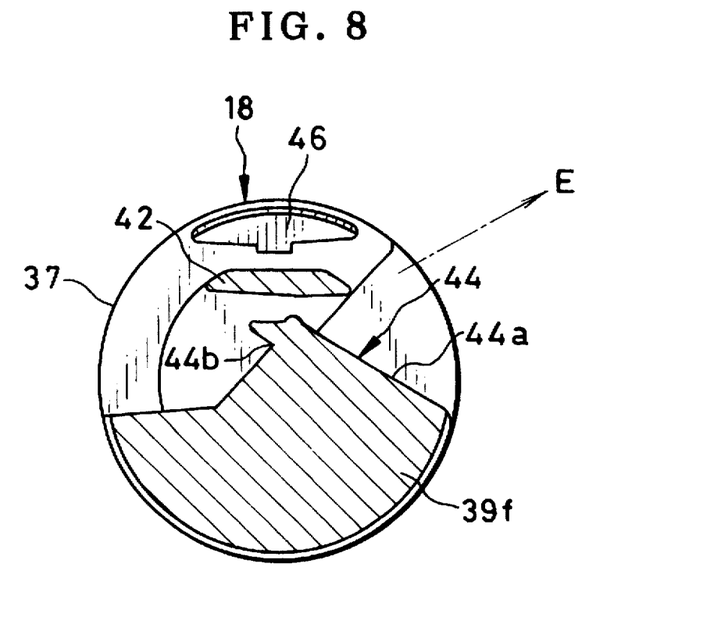
FIG. 8 is a cross section taken on line VIII—VIII in FIG. 6, illustrating the spool core.
Figure 9:
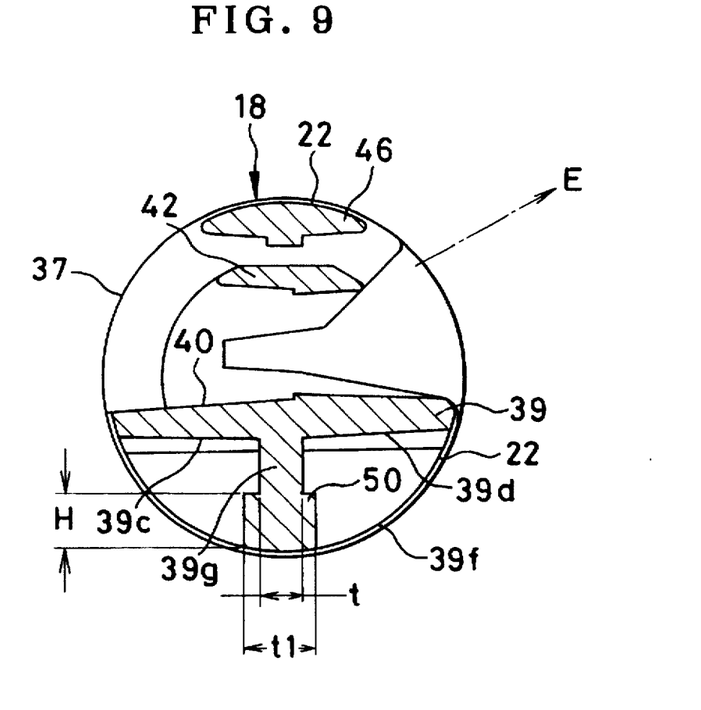
FIG. 9 is a cross section taken on line IX—IX in FIG. 6, illustrating the spool core.

The claw support plate 39 is molded by the at least two molds in a shape as viewed in sections of FIGS. 7, 8 and 9. In FIG. 7, the middle of the claw support plate 39 is depicted. Let E be a direction of advancing the photo film 12 to the outside of the cassette. As is also illustrated in FIG. 5, there is a flattened face 39a formed in a position opposite to the direction E, and by cutting away an edge of an opening of the receiving slot 40. The flattened face 39a has a gate mark. The cutout of the flattened face 39a is so deep that the gate mark does not scratch or damage the photo film. One of the molds has an auxiliary projection 156 (See FIG. 11A), confronted with a gate 158, immediately to contact the plastic material flowing out of the gate 158, for the purpose of avoiding a jetting phenomenon. In FIGS. 4 and 5, an auxiliary hole 39b is formed on a side reverse to the flattened face 39a as a result of the contact with the auxiliary projection 156. An arc-like plate 68 having a sufficient thickness is defined by the shape of the auxiliary hole 39b.

FIG. 8 is a cross section of the spool core 18 in the position of the retainer claw 44. The retainer claw 44 includes a guide slope 44a and a retainer notch 44b. The guide slope 44a is located on the side of the direction E in which the photo film 12 is advanced to the outside of the cassette. When the trailer of the photo film 12 is initially combined with the spool, the guide slope 44a guides the trailer in insertion through the spool for retention. The retainer notch 44b has a V-shape. When the photo film 12 is fully unwound out of the cassette shell, an edge of the retainer hole 12b is retained on the retainer notch 44b, and prevents the trailer from removal from the retainer claw 44 even when the trailer is curled.

The retainer claw 44 is required to have sufficient rigidity resistant to deformation even in contact with an inserter member. Directly under the retainer claw 44, a sector plate 39f is formed to remain as illustrated in FIGS. 4 and 5, as material saving is not effected in this position. The bottom of the retainer claw 44 is kept rigid enough. Also, directly under the retainer claw 43, a sector plate 39e is formed to remain as illustrated in FIGS. 4 and 5. The bottom of the retainer claw 43 is kept rigid enough.

FIG. 9 is a cross section of the spool core 18 in the position of the support tongue 46. Recesses 39c and 39d are formed in the claw support plate 39 as a result of saving the amount of the plastic material. The recesses 39c and 39d have shapes of advancing tips of projecting portions of molds as viewed in the directions of the relative movement. Between the recesses 39c and 39d, there is defined a radial plate 39g as protrusion of the underside of the claw support plate 39. The radial plate 39g has a regular thickness t. Also in the position of the support tongue 45, the recesses 39c and 39d are formed to define the radial plate 39g with the regular thickness t, as illustrated in FIG. 9. The recesses 39c and 39d have a range between the sector plate 39e and the disk-like portion 36 and a range between the sector plate 39f and the disk-like portion 37.

As viewed in the axial direction of the spool core 18, the retainer claws 43 and 44 have a thickness greater than that of the sector plates 39e and 39f. In the course of the molding operation, if time of cooling the molds, which is included in the cycle time, is too short, axial ends of the claw support plate 39 are likely to have deviation toward the second core portion 38 as a dimensional change causing an axial shift. There is a great difference in the mold shrinkage coefficient between the retainer claws 43 and 44 and the sector plates 39e and 39f because of the remarkable difference in the thickness.

On the bottom edge of the radial plate 39g, an edge projection 50 or thickened edge is formed. The edge projection 50 has a thickness t1, which satisfies $$1.2t \leq t1 \leq 2.4t,$$

and preferably satisfies $$1.5t \leq t1 \leq 2t.$$

Figure 10:
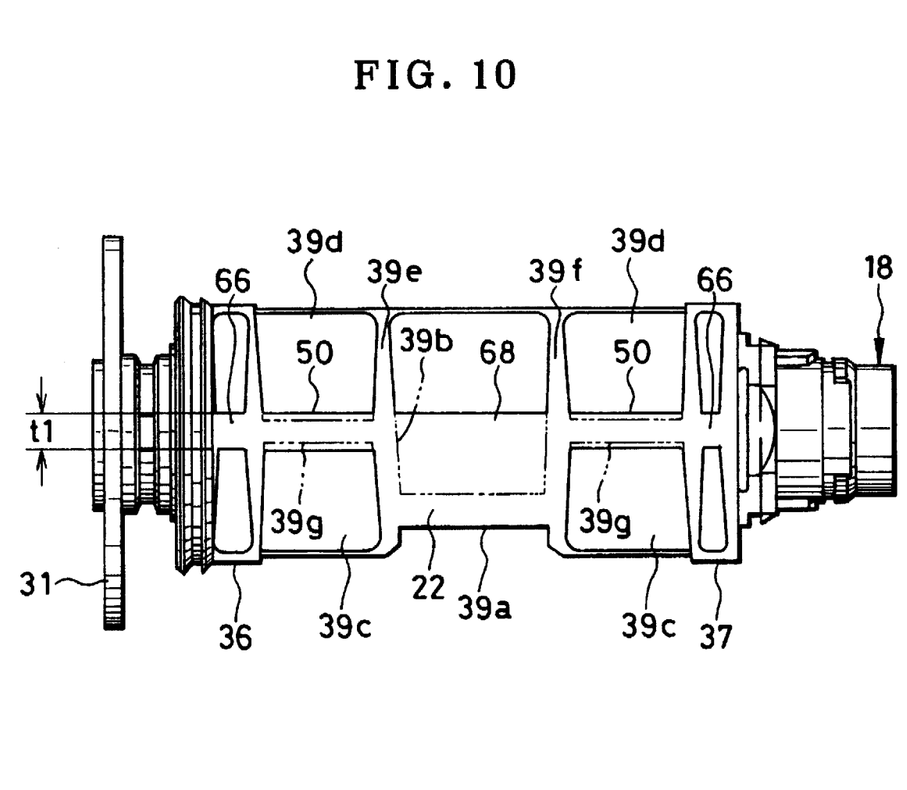
FIG. 10 is a bottom plan illustrating the spool core.

The edge projection 50 has a rectangular or square shape as viewed in the cross section, and satisfies $1.0 \text{ mm} \leq t1 \leq 2.5 \text{ mm}$, and $1.0 \text{ mm} \leq H \leq 2.5 \text{ mm}$, and preferably satisfies $1.5 \text{ mm} \leq t1 \leq 2 \text{ mm}$, and $1.5 \text{ mm} \leq H \leq 2 \text{ mm}$, where H is a range of the edge projection 50 in the radial direction of the spool core 18. The edge projection 50 is extended like two ridges in parallel with the axis of the spool core 18 as depicted in FIG. 10. It is to be noted that, in the present invention, the edge projection 50 may be formed like at least one spot projection in a position between the sector plate 39e and the disk-like portion 36 and between the sector plate 39f and the disk-like portion 37, in view of the purpose of reducing the shrinking factor in the molding. But the ridge-like shape of the edge projection 50 in the present embodiment is more favorable in increasing the same effect and an effect of preventing axial deviation of the spool core 18 and other changes in the size of the spool core 18.

In FIG. 10, rigid plates 66 are formed in the middle of the disk-like portions 36 and 37 or hubs. The rigid plates 66 have an equalized and sufficient thickness t3, which is nearly equal to t1. Between the recesses 39c, the arc-like plate 68 is located outside the auxiliary hole 39b. The arc-like plate 68 has flatness except for its arcuate curvature, and has a nearly equalized and sufficient thickness t4, which is nearly equal to t1.

Figure 11A:
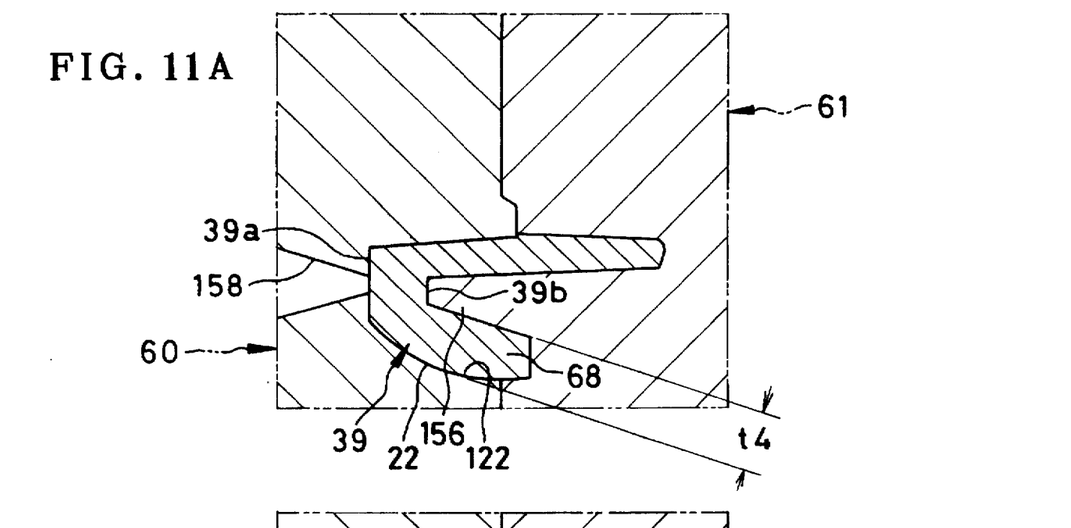
FIG. 11A is a cross section taken in a manner similar to FIG. 7, illustrating the set of the molds.
Figure 11B:
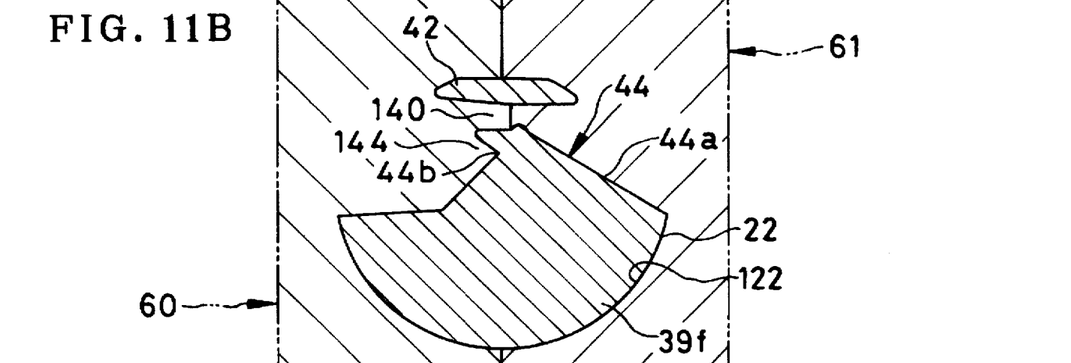
FIG. 11B is a cross section taken in a manner similar to FIG. 8, illustrating the set of the molds.
Figure 11C:
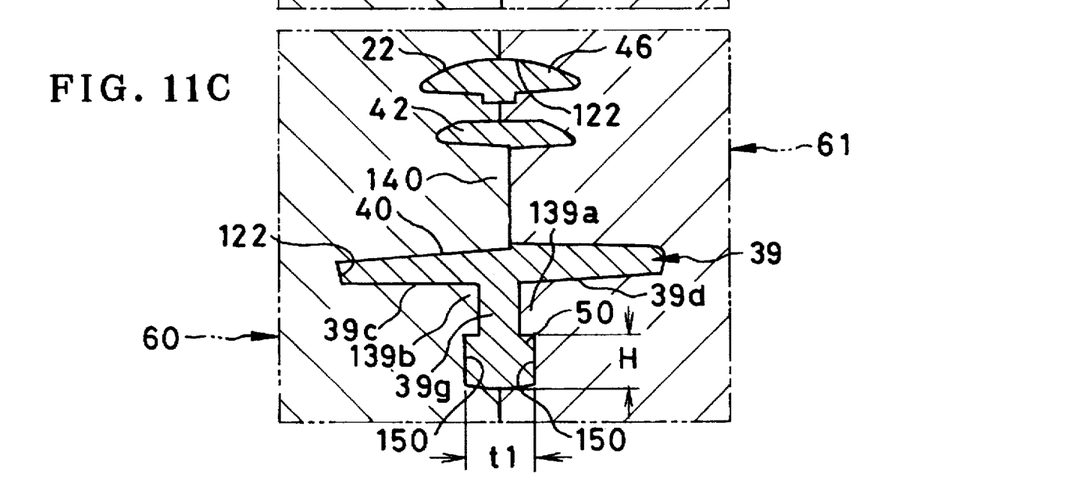
FIG. 11C is a cross section taken in a manner similar to FIG. 9, illustrating the set of the molds.

As the edge projection 50 is shaped to extend in a direction perpendicular to relative movement of the molds, the molds do not require a complicated shape. FIGS. 11A-11C illustrate a stationary mold 60 and a movable mold 61. In FIG. 11C, edge projection cavities 150 or cutouts are formed in surfaces of respective plate cavities 139a and 139b of the stationary mold 60 and the movable mold 61. To form the edge projection cavities 150, the stationary mold 60 and the movable mold 61 being used for the conventional spool core can be used and partially cut away. This is favorable in view of small cost in comparison with an alternative conception in which the stationary mold 60 and the movable mold 61 being used for the conventional spool core would be provided with portions where a thickness would be higher.

In FIGS. 11A-11C, a reference numeral 122 designates an arcuate concave face for forming the arcuate surface 22. A slot molding ridge 140 forms the receiving slot 40. A claw molding portion 144 forms the retainer claw 44. A reference numeral 158 designates the gate.

In the photo film cassette 10 of the present invention, the flange disks 19 and 20 are used for preventing the roll of the photo film 12 from loosening. A diameter D of the disk-like portions 36 and 37 or hubs of the spool core 18 is differently determined for a length of the photo film 12. The following are values of the diameter D of the disk-like portions 36 and 37:

the photo film 12 with the length for 40 exposures: D=7 mm;

the photo film 12 with the length for 25 exposures: D=10.7 mm;

the photo film 12 with the length for 15 exposures: D=12 mm.

In those examples of the spool core 18, only the diameter of the disk-like portions 36 and 37 or hubs is changed without changing the position of the receiving slot 40. The photo film 12 is 24 mm wide. The spool core 18 is 36.8 mm long in its longitudinal direction as depicted in FIG. 6, as is irrespective of the length of the photo film 12.

Figure 12:
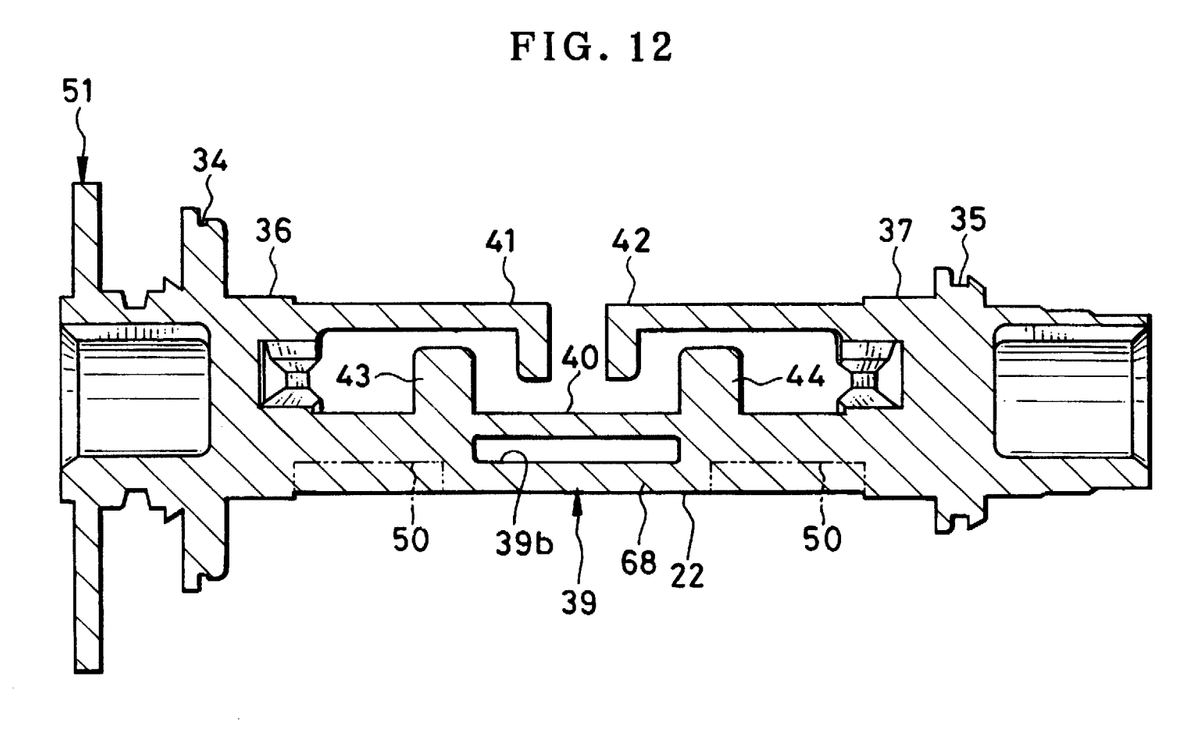
FIG. 12 is a vertical section illustrating another preferred embodiment of the spool core.

In FIG. 12, a spool core 51 for the photo film 12 with the length for 15 exposures is depicted. The spool core 51 is similar to the spool core 18 but does not have the support tongues 45 and 46. It is general that the greater the length of the photo film 12, the smaller the diameter of the disklike portions 36 and 37 or hubs associated with the photo film 12. In the spool core 51, no great difference in the level would remain between the resilient pressing portions 41 and 42 and the disk-like portions 36 and 37. The photo film 12 can be wound about the spool core 51 without eccentricity even without the support tongues 45 and 46. Of course the spool core 51 has the recesses 39c and 39d as a result of saving the amount of the plastic material, and has the edge projection 50.

The spool core 18, 51 is formed from high-impact polystyrene (HIPS) according to the injection molding. Other examples of material forming the spool core 18, 51 are polystyrene (PS), modified polyphenylene ether (PPE), polycarbonate resin (PC), polypropylene resin (PP), polybutylene terephthalate (PBT), polyethylene terephthalate (PET) and polyamide (PA) in view of suitability for the injection molding. Among them, desirable examples having sufficient rigidity are high-impact polystyrene (HIPS), modified polyphenylene ether (PPE) and polycarbonate resin (PC).

Figure 13:
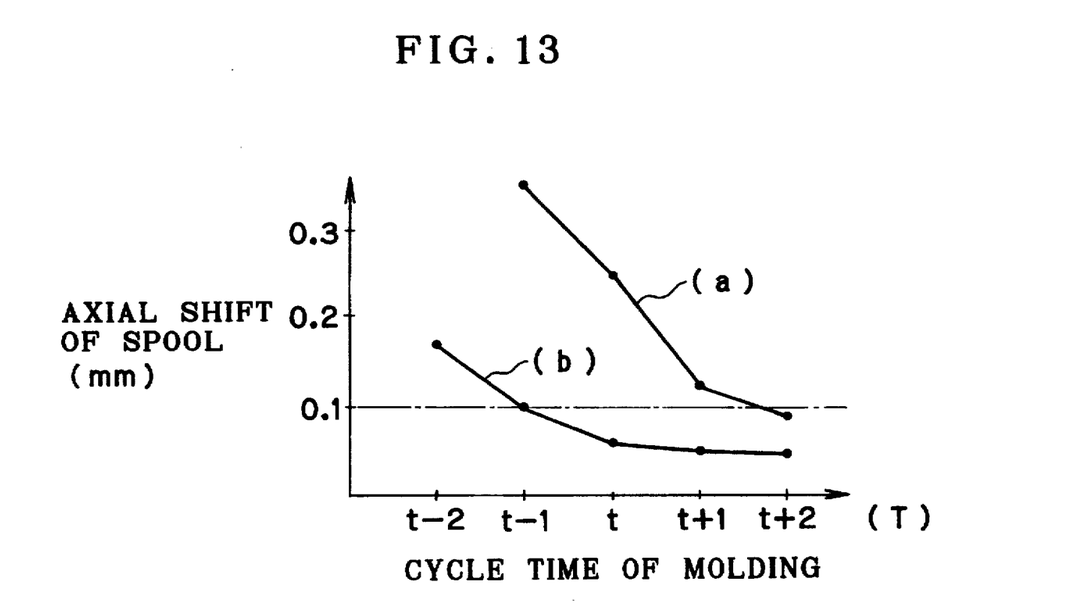
FIG. 13 is a graph illustrating a relationship between an axial shift of the spool core and molding cycle time.

For the performance of the spool core 18, 51, it is required in the molding to reduce an axial shift to 0.1 mm or less in view of sufficient precision. In FIG. 13, results of experiments regarding a comparative example a without the edge projections 50 and a sample of the present embodiment b with the edge projections 50. In the comparative example a without the edge projections 50, it was impossible to reduce the cycle time of the molding to a sufficiently small target value for the purpose of obtaining the required precision. In the sample of the present embodiment b with the edge projections 50 in contrast, the cycle time of the molding was remarkably reduced, so that the required precision was obtained even after the shortened cycle time.

In the above embodiment, the arcuate surface 22 of the spool core 18 is circular. The present invention is of course applicable to the spool core 18 of which the arcuate surface 22 is elliptical, or has a polygonal shape of which corners are rounded off without sharpness.

In conclusion, the feature of the present invention lies in a photo film spool which includes a spool core having an arcuate surface about which photo film is wound. A receiving slot is formed by cutting the spool core to extend in a longitudinal direction thereof, for receiving insertion of a trailer of the photo film, the receiving slot defining first and second core portions. At least one retainer claw is disposed on the first core portion, for retaining the trailer inserted in the receiving slot. A gap is formed by cutting a middle of the second core portion, for defining first and second resilient pressing portions, the first and second resilient pressing portions pressing the trailer retained on the retainer claw for preventing the trailer from disengagement from the retainer claw. At least first and second recesses are formed in the first core portion by cutting the arcuate surface, for defining a first radial plate having a first thickness t therebetween. At least one edge projection is disposed to project from the first radial plate, and communicated with the arcuate surface of the first core portion, for increasingly changing the first thickness t of the first radial plate to a second thickness t1, the second thickness t1 satisfying a condition of:

$$1.2t \leq t1 \leq 2.4t.$$

The at least one edge projection satisfies a condition of:

$$1.0 \text{ mm} \leq t1 \leq 2.5 \text{ mm},$$

and/or $$1.0 \text{ mm} \leq H \leq 2.5 \text{ mm},$$

where H is a range of the at least one edge projection in a direction toward the receiving slot from the arcuate surface of the first core portion.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A spool core for winding photo film, comprising:

first and second disk-like portions about which lateral edges of said photo film are wound;

a claw support plate, disposed between said first and second disk-like portions, and having a substantially flat top face;

at least one claw disposed to project from said top face, for retaining a trailer of said photo film;

at least one pressing portion, disposed over said claw support plate, for pressing said trailer toward said claw support plate;

first and second sector plates, disposed to project from a bottom face of said claw support plate, and having an arclike edge, said photo film being wound to cover said arc-like edge;

first and second plates, disposed between said sector plates and said disk-like portions, to project erectly from said bottom face of said claw support plate; and an edge projection disposed on an edge of at least one of said first and second plates, said edge projection satisfying a condition:

$$1.2t \leq t1 \leq 2.4t$$

where t is a thickness of said edge projection, and t1 is a thickness of said at least one of said first and second plates.

2. A spool core as defined in claim 1, wherein said edge projection has a side flush with said arc-like edge of said first and second sector plates.

3. A spool core as defined in claim 2, wherein said edge projection satisfies a condition:

$$1.0 \text{ mm} \leq H \leq 2.5 \text{ mm}$$

where H is a height of said edge projection.

4. A spool core as defined in claim 3, wherein said at least one claw comprises first and second claws, and said first and second claws are locally associated respectively with said first and second plates.

5. A spool core as defined in claim 4, wherein said at least one pressing portion comprises first and second pressing portions, said first and second pressing portions are disposed to project from said first and second disk-like portions in a cantilever manner.

6. A spool core as defined in claim 5, wherein said first and second pressing portions have respective free ends disposed between said first and second claws, and project toward said claw support plate to press said trailer.

7. A spool core as defined in claim 6, further comprising an arc-like plate, disposed between said first and second sector plates, and projecting from one side of said claw support plate, said photo film being wound to cover said arc-like plate.

* * * * *